INVENTOR
Robert W. Wolfe

INVENTOR
Robert W. Wolfe

# United States Patent Office 3,434,162
Patented Mar. 25, 1969

3,434,162
TOTALLY IMPLANTED ARTIFICIAL HEART POWER SYSTEM UTILIZING A RECHARGEABLE THERMAL ENERGY SOURCE
Robert W. Wolfe, Pittsburgh, Pa., assignor, by mesne assignments, to the United States of America as represented by the Secretary of the Department of Health, Education, and Welfare
Filed Dec. 13, 1966, Ser. No. 601,449
Int. Cl. A61f 1/22; F03g 7/06; F01n 3/02
U.S. Cl. 3—1                                                                 5 Claims The present invention relates to a power system for an artificial heart and, more particularly, to an implanted power unit for a totally implanted artificial heart which utilizes a rechargeable thermal energy source.

The provision of an implanted system for powering an artificial heart has received much consideration over the past several years but the problem of weight, volume, power output, reliability and danger when implanted in the human body have presented formidable obstacles. There are basically five broad categories of energy sources reasonably possible for artificial heart devices and these include devices utilizing exothermic chemical reactions, electrochemical reactions, compressed gases, radioisotope decay and thermal energy storage. Except for thermal energy storage, the others have been previously contemplated as power sources for artificial heart devices.

Some of these previously contemplated power sources include nickel-cadmium type batteries, silver-zinc type batteries, silver-cadmium type batteries, biologic fuel cells, and radioisotopes such as thulium 171 and plutonium 238. While these materials are feasible from an engineering standpoint, they do provide significant problems including recharging, weight and volume for the batteries and shielding (weight and danger) for the radioisotopes. Exothermic chemical fuels are unsatisfactory because of the necessity of providing fuel continuously to the device within the body from a source outside the body. Similarly, compressed gas is also unsuitable because of the weight factor.

It is therefore an object of the present invention to overcome the deficiencies of the prior art, such as indicated above.

It is another object of the present invention to provide for an implanted power source for driving an artificial heart device.

It is another object of the present invention to provide a novel system for driving an artificial heart utilizing a thermal energy storage device.

It is another object of the present invention to provide a novel totally implanted artificial heart.

It is another object of the present invention to provide a power unit for supplying pulsatile fluid pressure to drive an artificial heart within a mammal and combining a thermal energy storage unit, a device for periodically providing energy to the storage unit from outside the body, and a Rankine cycle engine driven by the thermal energy storage unit for supplying the pulsatile fluid pressure.

These and other objects, and the nature and advantages of the present invention will be more apparent from the following detailed description, taken in conjunction with the drawing wherein.

Figure 1:
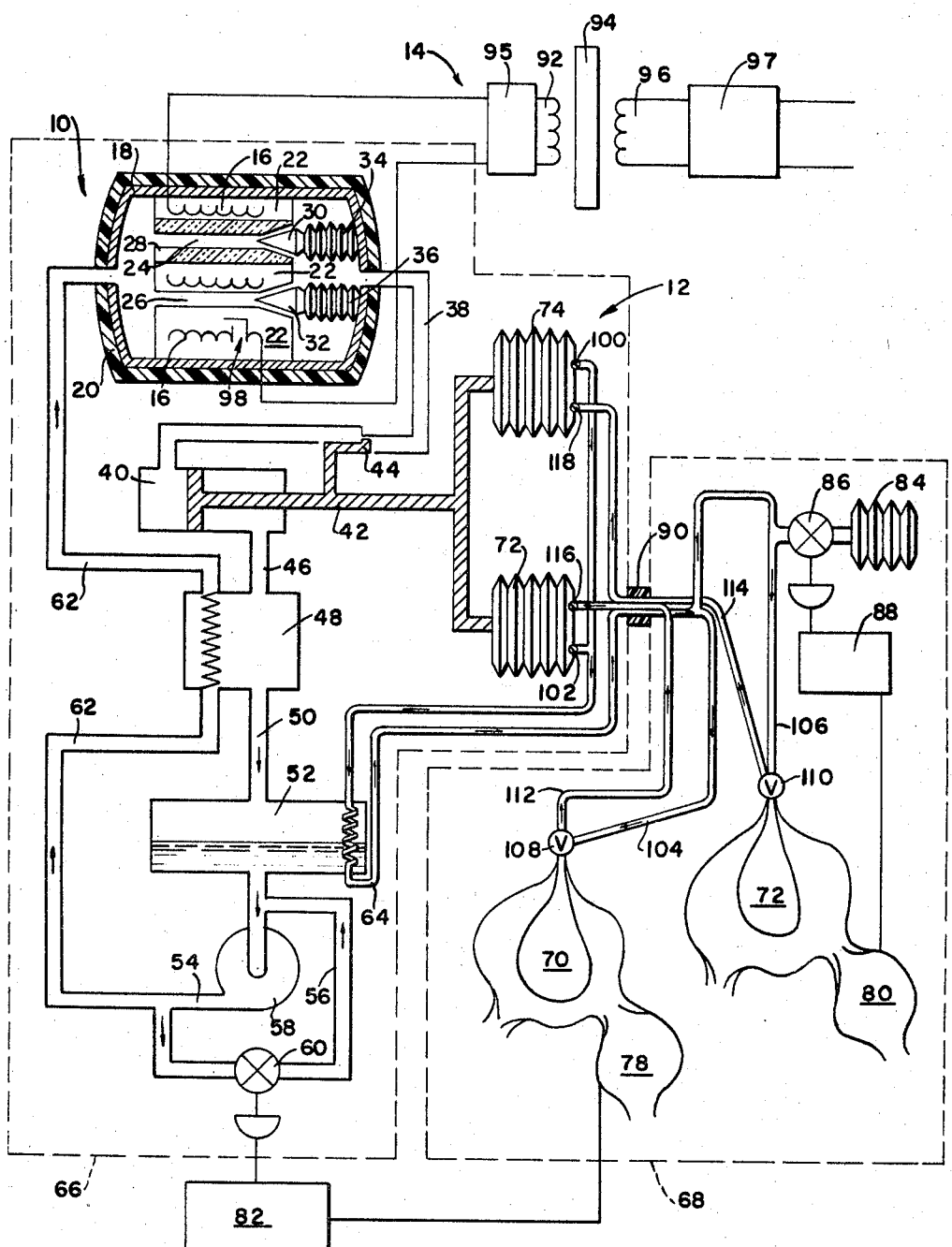
FIG. 1 is a schematic diagram of a device in accordance with the present invention.

In contrast to the proposed power sources described in the past, the present invention utilizes a thermal energy storage device which is embedded in the body and is recharged at convenient intervals, such as nightly, by an external source. The thermal energy storage system utilizes heat as a source of energy, i.e., the latent heat of fusion of a suitable material, preferably lithium hydride. Thus, broadly, through an outside source of energy, namely electrical, the lithium hydride is melted, preferably during the night, and during the day heat is withdrawn from the molten lithium hydride (thereby causing it to freeze) to power the artificial heart while the patient is free to move about unconstrained by any outside electrical connection. The nightly recharging by an outside electrical source is similar to the recharging of a battery except that the thermal energy storage unit stores thermal energy instead of electrical energy and utilizes electrical resistance heaters to effect fusion of the thermal energy storage material. To obviate the necessity of passing an electrical connection through the skin, the recharging is preferably carried out through an electromagnetic coupling across the skin of the mammal in which the device is implanted.

The selection of lithium hydride as a thermal energy storage material is based upon a number of factors including weight, volume, heat capacity, density and heat of fusion. Operation at the melting point of lithium hydride is selected because a large amount of energy is available at a constant temperature without any large changes in volume; in addition, the latent heat of fusion is large compared to the specific heat thereby providing another reason for utilizing the solid-liquid phase change as a source of energy. Lithium hydride appears to be the outstanding thermal energy storage material because its latent heat of fusion is extremely high (the highest known of any solid molecule); each atom is relatively light and small while the intermolecular binding forces are on the same order as those of heavier molecules. Heat from lithium hydride may be extracted as needed, lithium hydride is commercially available and is not unduly hazardous, and it melts at a temperature at which the heat to generate steam is required.

Lithium hydride has a melting point of 680° C. (1356° F.), a latent heat of fusion of about 4900 calories per gram mol, a density of about 0.8 gram per cubic centimeter, a ratio of latent heat of fusion to weight of about 620 calories per gram, and a ratio of latent heat times density to weight of about 490 calories per cubic centimeter. The energy requirements for a totally implanted artificial heart system have been determined to be approximately 384 watt hours (16 thermal watts for 24 hours); therefore the energy requirements is for about 330 kilocals of capacity (1.16 watt hours equals 1 kilocal) if the power source is recharged daily. The 24-hour capacity is used as a basis to allow a reserve of one-third over the usual maximum discharge time of 18 hours to account for a safety factor due to items such as overnight travel, social activity, natural catastrophe or a power failure. To provide the 330 kilocal capacity, it is necessary to provide 1.2 pounds (541 grams) and 42 cubic inches (688 cubic centimeters) of lithium hydride.

To contain such an amount of lithium hydride, along with the other requisite structure described in greater detail below and including an electromagnetic coil for recharging connected to a heating coil, necessary valves and insulation, the device must weigh approximately 6 or 6½ pounds and is about 4 inches in diameter and 6½ inches long with the recharging unit adding an additional two inches to the overall length.

Figure 2:
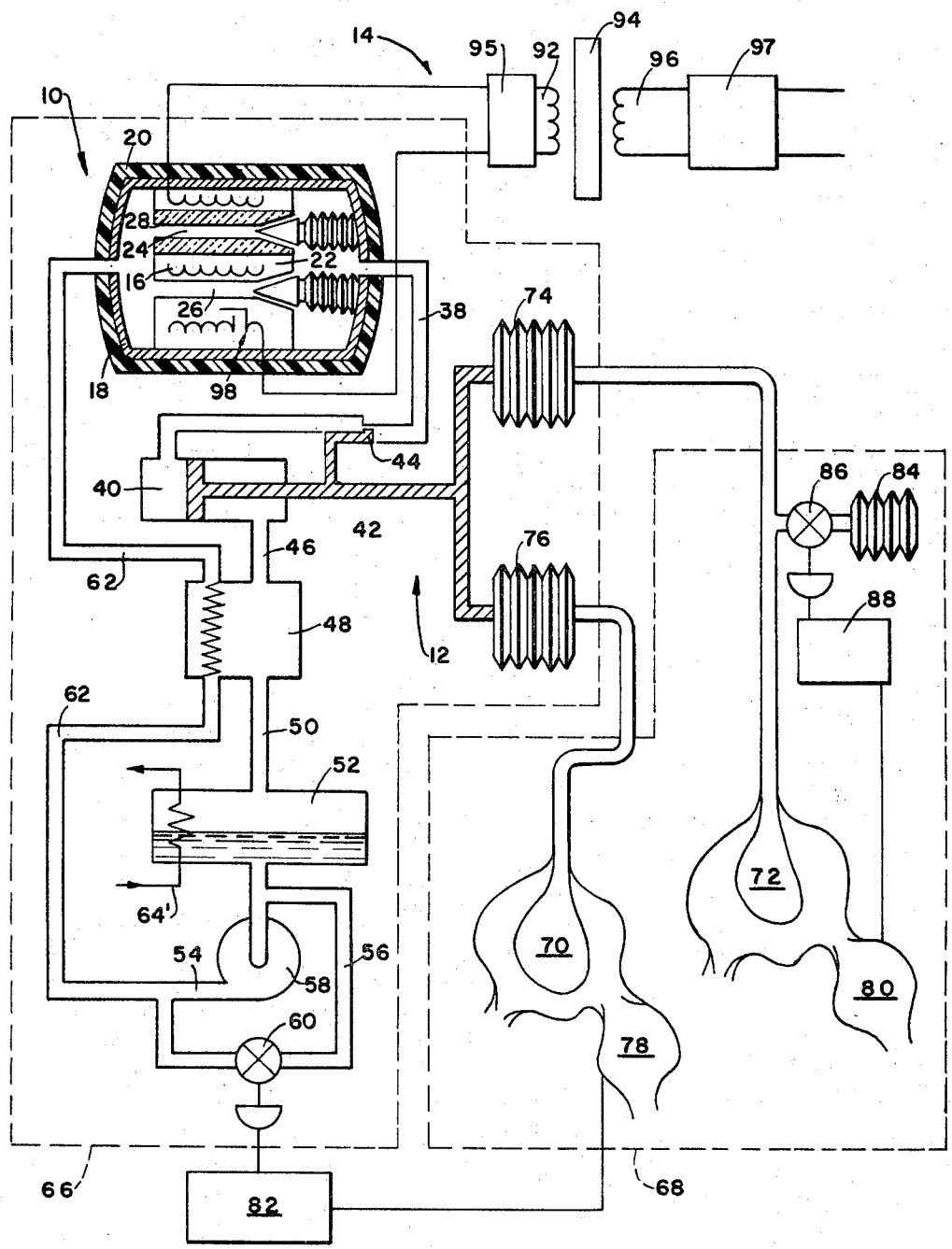
FIG. 2 is a schematic diagram, similar to FIG. 1, showing another embodiment of the present invention.

Referring more particularly to the drawings, FIGS. 1 and 2 show the combination of a lithium hydride heat source 10 which acts as a thermal energy storage unit, a Rankine cycle engine 12 which is driven by steam generated by the thermal energy storage unit 10, and an air core electromagnetic coil 14 connected to a resistance heater 16 within the thermal energy storage unit which remelts the lithium hydride during the sleeping hours of the user.

The thermal energy storage unit 10 comprises a boiler 18 formed of stainless steel or titanium. The boiler 18 is surrounded with suitable insulating material 20, described in greater detail below, which may be a foamed temperature resistant resin or a ceramic material, preferably cellular. Within the boiler 18 is provided a sealed section 22 containing the lithium hydride and into which the heating coil 16 passes. Two flow paths 24 and 26 are provided in the boiler 18 and pass through the lithium hydride containing sealed portion 22 so that water entering the boiler 18 from the left is heated within the flow paths 24 and 26 by the molten lithium hydride and thereby converted to steam. The flow path 24 has a greater thermal resistance between the water and the lithium hydride due to the provision of insulation 28 which is also preferably ceramic. At the outlet of the two paths 24 and 26 are provided valves 30 and 32, respectively, which are actuated by thermostatic bellows 34 and 36, although it should be understood that any heat responsive valves would be suitable. These thermostatically controlled valves 30 and 32 operate independently of power level to maintain a constant steam outlet temperature.

A steam passageway 38 is provided exiting from the boiler 18 and passing to a cylinder 40 of the Rankine Cycle Engine 12 in which a piston 42 reciprocates. The piston 42 is provided with a cut-off valve 44 which is stroke actuated to control the inlet of steam into the cylinder 40, although it should be understood that any suitable valve would be satisfactory.

Downstream from the cylinder 40 is a passageway 46 which leads to a heat exchanger or recuperator 48. A passageway 50 leads from the recuperator 48 to a condenser 52 where exhaust steam from the Rankine Cycle Engine is condensed.

From the condenser a passageway 54 is provided, which passes through a condensate pump 58 and then through a passageway 62 through the heat exchanger 48 and back to the boiler 18. The condensate pump 58 may be powered in any suitable manner such as by steam generated in the boiler 18. In addition, a passageway 56 is provided for bypassing the boiler 18, the heat exchanger 48 and the condenser 52; the passageway 56 is provided with a suitable by-pass valve 60.

An important characteristic of the Rankine Cycle is the discharge of heat from the condenser 52 to the blood of the mammal in which the power source is implanted. FIG. 2 merely shows the blood coolant flow 64' schematically and this may be carried out by actually passing blood through an artificial line 64' which passes through the condenser 52. The rejection of heat from the condenser to the blood at 64' may involve rejection of heat to arteries in the vicinity in which the unit is implanted in the body. The Reynold's number for blood flow in the aorta is 1500–2500 which is above the value necessary for fully developed laminar flow. To transfer 30 thermal watts necessary for the operation of the unit requires the equivalent of a ⅝ inch inner diameter tube 10 inches in length which will produce a 2% temperature rise in the artery for a flow of approximately ½ liter per minute.

One embodiment of the invention, however, utilizes the coolant capacity of the blood flowing through the artificial heart and one means of accomplishing this result is illustrated in FIG. 1 wherein heat of condensation of the water in condenser 52 is passed to the hydraulic fluid in line 64 which in turn rejects its heat to the blood in the artificial heart. This latter system is structurally more complicated in certain respects and will be described in greater detail below.

In operation, exhaust steam from the Rankine Cycle cylinder 40 is condensed in the condenser 52 by the coolant blood flow 64' (or to the intermediate hydraulic fluid through line 64 and then to the blood). This blood flow must be great enough to satisfactorily condense the peak steam flow occurring at the maximum power level without exceeding the allowable blood temperature. The maximum blood side temperature is approximately 103° F. For the heat transfer mechanisms involved this results in a steam temperature of approximately 105° F. with a corresponding saturation pressure of 2.24 inches of mercury. With this back pressure the expander operates with an acceptable expansion efficiency.

The condensate is pumped up to system operating pressure by the condensate pump 58. The pump by-pass valve 60 is provided for control purposes. Condensate is passed through the recuperative heat exchanger 48 and is heated by the piston expander exhaust flow. The heated condensate flows into the boiler 18 and as water passes through the boiler flow paths 24 and 26 it receives heat from the liquid lithium hydride in the sealed compartment, 22.

The superheated steam generated in the boiler, at approximately 700 p.s.i. and 800° F., exits from the boiler 18 and passes through passage 38 through the stroke actuated cut-off valve 44 and then to the cylinder 40. The exhaust steam passes out of the cylinder and into the recuperator 48 where it is cooled by heating the condensate as previously described. The exhaust steam then passes into the condenser and the closed loop is completed.

The closed Rankine Cycle is selected for the totally implanted heart power system because it is necessary to provide a closed cycle for implantation in the body. The reciprocating piston is selected because it has high expansion efficiency at the low power level provided by the steam, i.e., the mechanical work delivered by the piston per pound of steam flow is approximately 80–90% of the expansion work available per pound of steam when the steam expands from the boiler pressure to the condenser pressure. The Rankine Cycle utilizes the change in state of the working fluid from liquid to gas in the boiler and from gas to liquid in the condenser. Another advantage to the reciprocating piston 42 is that its pressure-volume characteristic can be designed to be very similar to that of the natural heart. In addition, such a low speed reciprocating engine has a relatively long life.

As indicated above, a characteristic of the Rankine Cycle is its necessity of rejecting waste heat to the body in which the cycle is implanted, and this requires a condenser temperature above the maximum body temperature (approximately 100° F.). Water-steam provides the most desirable working fluid in the Rankine Cycle because it permits a large difference in temperature between the boiler and condenser temperatures, thereby increasing the thermal efficiency, it has a high vapor pressure. In addition, design based on the Rankine Cycle is reliable due to the fact that water-steam is one of the oldest working fluids for which there are excellent thermodynamic data.

As with the boiler 18, the cylinder 40 and the piston 42 are preferably formed of titanium or stainless steel. The inside of the cylinder 40 is preferably provided with a silver-graphite sleeve which insures constant and dependable lubrication; the water vapor will be absorbed by the graphite sleeve thereby forming an excellent lubricating surface for travel of the piston 42 therein. As stated above, steam generated in the boiler will be at about 800° F. and about 700 p.s.i. (about 300° F. of superheat since the saturation temperature at 700 p.s.i.a. is 503° F.). Stainless steel and titanium are both capable of withstanding such temperatures since, e.g., stainless steel has an upper operating temperature limit in excess of 1100° F.

As indicated above, the vapor pressure of water in the condenser at 105° F. will be from 2.24 inches of mercury, (less than 1 p.s.i.a.), less than atmospheric pressure and lower than the surrounding blood pressure.

The piston 42 and cylinder 40 should be provided with such a length so that the expansion ratio (stroke of the piston) is no greater than about 8 or 10 (preferably 10). This is desirable because the rate of increase of efficiency decreases as the expansion ratio increases beyond a certain unit length of piston travel while frictional losses are approximately the same; also for a greater stroke the engine size and weight must be proportionally higher with very little increase in work. In addition it is desirable to maintain a large difference in pressure between the cut-off pressure at the valve 44 and the condenser pressure, since this improves exhausting of the piston 40.

Figure 3:
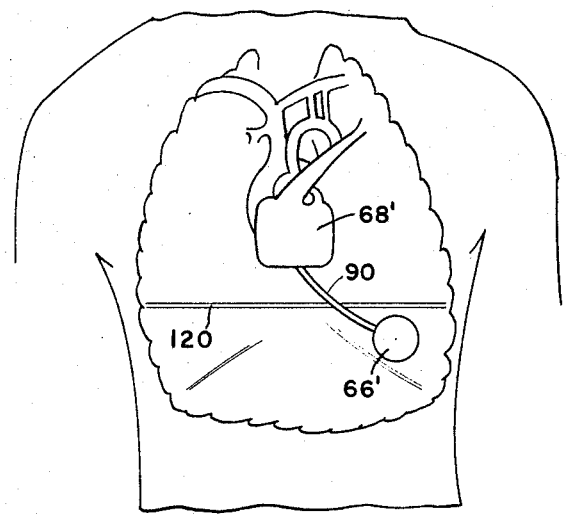
FIG. 3 is a schematic diagram showing the implantation of the device of the present invention in a human body.

In actual construction (actual internal construction not shown) as described above, the power unit, represented by the elements in the dotted envelope 66 in FIGS. 1 and 2 and shown in location in FIG. 3, will be about 4 inches in diameter and 6½ inches long and the walls of the cylinder 40 will be surrounded by boiler 18 to reduce heat losses. Calculating the various losses in the system, the overall efficiency will be about 10–13% based upon the pumping power delivered to the blood pump compared to the total thermal power input. Thus, only about 23 watts power input is needed to the system and this is easily provided by the thermal energy storage unit without in any way exceeding the heat dissipation limit.

With respect to the heart pumps per se, the system of the present invention may be used with a variety of fluid pressure operative heart pumps, either of the natural heart assisting variety or those which will totally replace the natural heart. Regardless of the type of artificial heart utilized with the present system, however (and over 40 different models have been proposed by workers in the field in the years between 1957 and 1965), these artificial hearts must meet certain requirements. Thus, such artificial hearts must have the capacity to adequately drive the blood throughout the body of the mammal in which the device is placed; must be able to change with the changing requirements of the mammal, such as providing greater pumping under stress or more work; it should operate at a slow enough speed so that it can be placed in the mammal; the blood should not be negatively aspirated into the artificial atria; the pressures exetered should be maintained in a range so as not to damage the vascular system (i.e., minus 4 to plus 4 centimeters of water pressure for the inlet and no more than 50 millimeters of mercury pressure for the pulmonary artery at 200 millimeters of mercury pressure for the aorta); and the flow should be pulsatile.

Among the various types of blood pumps which may be used in relation to the present system, are those which are hydraulically actuated and controlled by a modified fluid amplifier. These various blood pumps have means for minimizing flow losses in the hydraulic system by reducing flow and by using a linkage with a mechanical advantage of approximately 5:1. The blood pumps are in general designed to operate according to Starling's Law and will not produce high negative venous pressures. In addition, they have means for balancing blood flow in the left and right ventricals such as the bellows 84, to prevent the pressure in the right ventrical from rising more rapidly than that in the left ventrical since the two pressures are in series.

The artificial heart schematically illustrated in FIGS. 1 and 2 and located wthin the dotted envelope 68 represents a totally implanted artificial heart which is intended to completely replace a diseased natural heart. Hearts of this type may comprise a left ventricle 70 and a right ventricle 72 which are formed of elastomeric material, preferably a silicone rubber (Silastic sac-type heart pumps). In the illustrated embodiments, the fluid pressure generated by the Rankine Cycle Engine expands the artificial ventricles 70 and 72 to effect pumping of the blood.

Considering FIG. 2 in greater detail, the piston 42 of the Rankine Cycle Engine is connected to a pair of bellows 74 and 76 which are filled with fluid, either pneumatic or hydraulic, and which pass directly to the ventricles 72 and 70, respectively. The bellows 74 and 76 are actuated simultaneously by the piston 42 to compress the two ventricles 70 and 72 simultaneously, or they can be arranged to compress these ventricles alternately, so that the left side is compressed on the piston power stroke and the right side is compressed on the piston return stroke. A third alternative would be the use of one bellows and a pressure reduction throttle in the line leading to the right ventricle 72.

Two basic control functions are needed: these are the rate of pulsation and the relative stroke-volume of the right and left ventricle. These two functions are actuated by the controlled variables, atrial or venous pressures 78 and 80. To control the pulse rate, venous pressure 78 may be sensed by a transducer and controller 82 which will actuate the by-pass valve 60. Since mean arterial pressure is nominally constant over the required range of blood flow, the force resistance in the ventricle, which is transmitted back to the piston, remains constant as the piston rate rises to satisfy increased blood flow rate requirements (as signalled by the rise in venous pressure). Thus, a rise in boiler pressure is not required, although the steam flow rate is adjusted by means of adjusting the condensate pump bypass valve 60.

To provide differential stroke-volume capability, a reservoir bellows 84 is connected to the right ventricle supply fluid, through a throttle valve 86. This throttle valve is controlled by the transducer and controller 88 by sensing the venous pressure 80. When the venous pressure rises, the throttle valve is closed, thereby reducing the effective volume into which the bellows 74 injects. This ejects a larger amount of blood from the right ventricle, thereby providing greater volume for inflow during the following diastole.

The heart device of FIG. 1 operates in a similar manner except that separate fluid pressure lines must be provided to maintain circulation of the hydraulic material therein since this hydraulic fluid acts as an intermediary in the transfer of heat from the condenser 52 to the blood. Thus, in the device of FIG. 1 the bellows 74 is provided with a one-way outlet valve 100 which empties into the hydraulic line 64 and, similarly, the bellows 72 is provided with a one-way outlet valve 102 which empties into the same hydraulic line 64. Line 64, after passing through the condenser 52, passes out of the envelope 66 (the physical unit containing the thermal storage unit and the engine), through a tube 90 having a heat insulating cover thereon (preferably cellular plastic) and to each ventricle 70 and 72 via separate lines 104 and 106, respectively.

The ventricles 70 and 72 are provided with 2-way valves 108 and 110, respectively, which only permit the flow of fluid from lines 104 and 106 into, respectively, ventricles 70 and 72 in one direction. Exiting from the valves 108 and 110 are return lines 112 and 114, respectively, which pass back through the insulated tube 90 to the bellows 72 and 74, respectively. The 2-way valves 108 and 110 only permit the flow of hydraulic fluid into the lines 112 and 114. Between the lines 112 and 114, and their respective bellows 72 and 74, are provided another pair of one-way valves 116 and 118, respectively, which only permit the flow of hydraulic fluid into the bellows 72 and 74.

The pulsating fluid pressure system has a relatively high transmission efficiency. There are two major factors which would lead to a serious reduction in this efficiency and these are (1) a large pressure drop across the blood pump check valves and significant coulomb friction losses resulting from the choice of pump diaphragm material, and (2) losses resulting from the use, for configuration simplicity, of only one bellows for both ventricles. This approach would require throttling the flow into the right ventricle down to the pulmonary pressure level and would reduce the transmission efficiency to approximately 62%.

The third component of the system, described only briefly above, is the recharging device 14. This recharging device comprises an electromagnetic coil 92 buried beneath the surface of the skin 94 and directly connected to the resistance heater 16 during charging. An outside complementary electromagnetic coil 96 is placed adjacent the skin 94 beneath which the first coil 92 lies. It has been demonstrated [1] that power on the order of 50 watts can be transferred across the skin in this manner with no apparent harm to the tissue.

When the lithium hydride is completely melted and its temperature begins to rise above the melting point temperature, a thermostatic switch 98 in the boiler 18 opens and the power input ceases. The open circuit drastically changes the impedance of the external coil 96 which in turn is sensed by a power conditioning and control circuit 97 which shuts off the input power. If desired, a charge control 95 may be embedded with the coil 92 to effect further control.

It has been shown,[2] that large amounts of electrical power can be transferred through the skin with optimum frequencies of about 350 kilocycles. Tissue losses are encountered above this value because of induced electrical currents. Lower frequencies, on the other hand, do not give the best coupling between coils. The efficiency of such a transport across the skin can be as high as 95%. To obtain good coupling, the distance between the coils should not be more than the distance equal to about 1/3 the diameter of the coil, and thus, the coil 92 should be implanted as close as possible to the skin surface and coils as large as possible are desirably used.

The utilization of such high frequency transmission across the skin has a number of advantages. Thus, there is no necessity to penetrate the chest wall with a permanent connection and the efficiency is quite high; similarly the power levels are entirely adequate. The main disadvantages, on the other hand, relate to the placing of the coils adjacent to one another. Thus, the coils must be close together since as their distance apart is increased, the coefficient of coupling decreases. For coils for 10 centimeters in diameter, separations of 3 centimeters are permissible. There is also a problem in the axial displacement of the coils since, a coil are moved sidewards, the number of magnetic lines that pass through both coils is reduced. These problems can, however, be satisfactorily overcome by careful placing of the internal coil 92 and by careful strapping of the external coil 96 over the internal coil 92 during recharging. Thus, the exterior portion 96 of the electromagnetic coupling, connected to an external power source supply, may be contained in a sac or vest which the patient can strap on in an accurate position over the internal coil 92. Since at least 50, and reasonably 75–120 watts can be passed through the coupling, daily recharging takes 5–8 hours which can either be spread over several periods, such as during meals, if desired, or which can be carried out during the sleeping hours.

The utilization of lithium hydride as the power source material provides one problem which, however, can be solved along with the problem of thermo-insulation. Thus, dissociation of lithium hydride into lithium and hydrogen can become a problem if this material is heated substantially above its melting point with the result of hydrogen diffusion from the container 22. On the one hand, stainless steel, from which the container should be formed, shows good resistance to lithium corrosion. The diffusion of hydrogen through the metal, on the other hand, can be inhibited by coating the stainless steel container 22 with an insulating nonmetallic coating, of similar thermal expansion coefficient. In addition, the thermal insulating material around the lithium hydride container should be saturated with hydrogen and this will both inhibit hydrogen diffusion and heat diffusion.

Referring to FIG. 3, the location of the thermal energy storage unit and the Rankine Cycle Engine in the container 66' will be seen to be directly beneath the diaphagram 120 of the patient on the left side. The artificial heart 68' is implanted in the approximate location previously occupied by the diseased natural heart. The fluid pressure line 90 passes between the container 66' through the diaphragm 120 to the artificial heart 68'.

Implanatation of an artificial heart necessitates a period of total cardio-pulmonary bypass, utilizing the presently standard cardio-pulmonary bypass techniques. The placement on the artificial heart is most easily performed through a sternal split incision. The patient is then connected to the pump oxygenator with the standard cardio-pulmonary bypass, the only modification in such bypass being the placement of one catheter into the superior vena cava through the jugular vein and the other cathether in the inferior vena cava through the femoral vein. The surgeon then excises the diseased heart, trans-sectioning the vena cava at their entry site into the right atrium, transecting the pulmonary artery as it exits from the right ventrical, transecting the pulmonary veins either individually (or, more logically, as "a manhole cover" of atrial wall containing the four pulmonary veins) and then transecting the aorta slightly above the coronary artery orifices. The artificial heart pumps will then be sutured into the atria by means of silk sutures so that it will be positioned entirely within the mediastinum. Other known types of mechanical junctions for providing blood tight anastomosis may also be used.

A second incision will then be made in the left hemidiaphragm to permit placement of the power source in the left upper quadrant of the abdomen lateral to the stomach and near the tail of the pancreas. The hydraulic or pneumatic line 90 between the power supply 66' and the blood pumps 68' will then pass posteriorily and superiorily to the mediastinum through a surgically created aperture in the diaphragm. After placement in a dacron envelope, the power source may be surgically affixed in one of several ways:

(1) Stainless steel wire sutures may be employed to tie the dacron envelope containing the power source to the lateral portion of the bony thoracic cage. These sutures may be passed in a paracostal fashion without entering the pleural cavity.

(2) The dacron envelope may be sutured to the undersurface of the diaphragm and to facia of the lateral abdominal wall and, within the passages of 3–6 weeks, growth of fibrous tissue into the dacron material will provide additional stabilization of the device in the lateral-superior portion of the left upper quadrant of the abdomen.

A power unit for supplying pulsatile fluid pressure to to drive an artificial heart in accordance with the present invention thereby provides a highly effective thermoenergy storage unit containing lithium hydride and having an overall thermal efficiency of about 12%, a thermal input of approximately 15.8 watts, an energy requirement for 24 hour recharging of 380 watt hours, a recharging rate of up to about 120 watts, a recharging time of from a minimum of about 3.5 hours to about 8 hours, and a satisfactory life of at least about 5 years; in addition, the device will be controlled by normal physiologic response.

It will be obvious to those skilled in the art that various changes may be made without departing from the scope of the invention and the invention is not to be considered limited to what is shown in the drawings and described in the specification.

What is claimed is:

---

[1] J. C. Schuder et al.: "High Level Electromagnetic Energy Transfer Through a Closed Chest Wall," 1961, IRE, Interaction Convention Record, Part 9, Page 119; "Energy Transport Into the Closed Chest From a Set of Very Large Mutually Orthogonal Coils," Communication and Electronics, January 1963; "Energy Transport Through a Coil Which Circumscribes a Ferrite Core and Is Implanted in the Body"; Proceedings of the 1964 17th Annual Conference on Engineering and Medicine and Biology; "Energy Transport and Conversion for a Permanently Implanted Artificial Heart," vol. 9, ASAIO, 1963.

[2] Note previous footnote.

1. A power unit for supplying pulsatile fluid pressure to drive an artificial heart within a mammal comprising the combination of:
- a Rankine Cycle Engine including a reciprocating piston—for supplying said pulsatile fluid pressure—driven in a cylinder by steam pressure, and a steam condenser connected downstream from said cylinder, said condenser having heat transfer means connected thereto for giving off heat of condensation to the blood of the mammal in which the power unit is adapted to be placed;
- a thermal energy storage unit connected to said cylinder for supplying heat to said engine to generate steam for driving said piston, said thermal energy storage unit comprising molten lithium hydride which supplies said heat from its heat of fusion;
- means for periodically melting said lithium hydride, comprising an electrical heating coil within said energy storage unit, and means to supply electrical energy to said heating coil from outside the body of the mammal; and
- means to pump condensate from said condenser to said thermal energy storage unit.

2. A heart power unit in accordance with claim 1 wherein said engine and said thermal energy storage unit are located within a casing for surgical implantation to the rib of a mammal below its diaphragm, and further comprising an insulated conduit extending from said casing adapted to receive a fluid medium passing between said casing and the artificial heart to be driven by said pressure of said fluid medium.

3. A heart power unit in accordance with claim 1 wherein said electrical energy supplying means comprises a pair of adjacent air core wire coils, the first of said pair adapted to be implanted beneath the skin of the mammal and directly connected to said heating coil, and the second of said pair adapted to be placed adjacent the outer surface of the skin opposite said first coil during remelting of said lithium hydride and being directly connected to an outside source of electricity.

4. A heart power unit in accordance with claim 1 wherein said engine and said thermal energy storage unit form a closed steam-water circuit comprising an insulated boiler for said molten lithium hydride to convert water to steam, a steam passageway from said insulated boiler to said cylinder for driving said piston, a heat-exchanger downstream from said piston for said steam to preheat water passing to said insulated boiler, a passageway to said steam condenser, and a condensate pump for pumping said water from said condenser through said heat-exchanger to said insulated boiler.

5. A heart power unit in accordance with claim 1 wherein said thermal energy storage unit comprises an insulated boiler having said lithium hydride therein, said heating coil also lying within said insulated boiler, wall means within said boiler defining a first steam-water flowpath within said boiler, insulated wall means within boiler defining a second steam-water flowpath, said lithium hydride being contained behind said internal wall means and said internal insulated wall means, and thermo-statically controlled valve means at the outlet of each said steam-water flowpath to maintain a constant steam outlet pressure independent of power level.

References Cited

UNITED STATES PATENTS

| | | | |
|---|---|---|---|
| 3,029,596 | 4/1962 | Hanold et al. | 60—24 |
| 3,147,744 | 9/1964 | Percival | 122—33 |
| 3,152,340 | 10/1964 | Fry et al. | 3—1 |
| 3,379,191 | 4/1968 | Harvey | 3—1 XR |

OTHER REFERENCES

"Studies on the Aritificial Heart Driven With Controlled Gas Pressure Device on the Pressure Generator for Universal Use," by S. Kimoto et al., Trans. Amer. Soc. Artif. Int. Organs, vol. X, 1964, pp. 66–67.

"An Artificial Heart Inside the Body," by W. J. Kolff, Scientific American, vol. 213, No. 5, November 1965, pp. 39–49.

"The Artificial Intracorporeal Heart," by J. H. Gibbon, Surgery, vol. 59, No. 1, January 1966, pp. 1–5.

RICHARD A. GAUDET, *Primary Examiner*

R. L. FRINKS, *Assistant Examiner*.

U.S. Cl. X.R.

60—25, 95; 122—33